(12) United States Patent
Wippermann et al.

(10) Patent No.: US 11,244,434 B2
(45) Date of Patent: *Feb. 8, 2022

(54) MULTI-APERTURE IMAGING DEVICE

(71) Applicant: Fraunhofer-Gesellschaft zur Förderung der angewandten Forschung e.V., Munich (DE)

(72) Inventors: Frank Wippermann, Meiningen (DE); Andreas Brückner, Jena (DE); Andreas Bräuer, Schlöben (DE); Alexander Oberdörster, Jena (DE)

(73) Assignee: Fraunhofer-Gesellschaft zur Förderung der angewandten Forschung e.V.

(*) Notice: Subject to any disclaimer, the term of this patent is extended or adjusted under 35 U.S.C. 154(b) by 0 days.

This patent is subject to a terminal disclaimer.

(21) Appl. No.: 16/878,771

(22) Filed: May 20, 2020

(65) Prior Publication Data
US 2020/0357103 A1 Nov. 12, 2020

Related U.S. Application Data

(63) Continuation-in-part of application No. 15/903,276, filed on Feb. 23, 2018, now Pat. No. 10,701,340.
(Continued)

(30) Foreign Application Priority Data

Aug. 24, 2015 (DE) .................... 10 2015 216 140.4

(51) Int. Cl.
*G06T 5/50* (2006.01)
*G06T 5/00* (2006.01)
*H04N 5/232* (2006.01)

(52) U.S. Cl.
CPC ............ *G06T 5/50* (2013.01); *G06T 5/004* (2013.01); *H04N 5/23229* (2013.01); *G06T 2207/20221* (2013.01)

(58) Field of Classification Search
CPC ........... H04N 13/0242; H04N 5/247; H04N 5/23238; H04N 5/23232; H04N 5/2258
See application file for complete search history.

(56) References Cited

U.S. PATENT DOCUMENTS 7,132,664 B1 * 11/2006 Crosetto ............... G01T 1/1612
250/367
8,629,930 B2 1/2014 Brueckner et al.
(Continued)

FOREIGN PATENT DOCUMENTS

CN 103210641 A 7/2013
CN 103649994 A 3/2014
(Continued)

OTHER PUBLICATIONS

Office Action dated Feb. 29, 2020 issued in parallel Indian patent application No. 201837006079.
(Continued)

*Primary Examiner* — Zaihan Jiang
(74) *Attorney, Agent, or Firm* — Haynes and Boone, LLP

(57) ABSTRACT

A multi-aperture imaging device that is, on the one hand, able to provide image information on a scene and, on the other hand, allows obtaining high lateral resolution and/or a wide total field of view, is described. The multi-aperture imaging device is provided with a first plurality of optical channels for projecting overlapping first partial fields of view of a total field of view on first image sensor areas of an image sensor of the multi-aperture imaging device, as well as with a second arrangement of optical channels for pro-
(Continued)

jecting at least a part of of the total field of view on a second image sensor area of the image sensor.

20 Claims, 10 Drawing Sheets

Related U.S. Application Data which is a continuation of application No. PCT/EP2016/069821, filed on Aug. 22, 2016.

(56) References Cited

U.S. PATENT DOCUMENTS

| | | | | |
|---|---|---|---|---|
| 9,013,543 | B1* | 4/2015 | Furukawa | H04N 5/23238 |
| | | | | 348/36 |
| 9,769,458 | B2 | 9/2017 | Wippermann et al. | |
| 2009/0051772 | A1 | 2/2009 | Rhoads | |
| 2012/0098971 | A1* | 4/2012 | Hansen | H04N 5/33 |
| | | | | 348/164 |
| 2013/0076866 | A1* | 3/2013 | Drinkard | H04N 7/181 |
| | | | | 348/47 |
| 2013/0094705 | A1* | 4/2013 | Tyagi | F16P 3/144 |
| | | | | 382/103 |
| 2014/0071247 | A1 | 3/2014 | Imamura et al. | |
| 2014/0085431 | A1* | 3/2014 | Freiburg | G02B 5/04 |
| | | | | 348/48 |
| 2016/0005154 | A1* | 1/2016 | Meyers | G06T 5/008 |
| | | | | 382/274 |
| 2016/0086379 | A1* | 3/2016 | Sadi | G06F 3/013 |
| | | | | 345/633 |
| 2016/0088287 | A1* | 3/2016 | Sadi | H04N 13/261 |
| | | | | 348/43 |
| 2016/0203371 | A1* | 7/2016 | Tyagi | F16P 3/144 |
| | | | | 382/103 |
| 2017/0118388 | A1 | 4/2017 | Wippermann et al. | |
| 2017/0161554 | A9* | 6/2017 | Hong | G06K 9/00335 |
| 2018/0035134 | A1* | 2/2018 | Pang | H04N 5/2226 |
| 2018/0225866 | A1* | 8/2018 | Zhang | G06T 7/593 |

FOREIGN PATENT DOCUMENTS

| | | |
|---|---|---|
| CN | 103675960 A | 3/2014 |
| CN | 204575985 | 8/2015 |
| DE | 102009049387 A1 | 4/2011 |
| DE | 102013222780 B3 | 4/2015 |
| DE | 102014213371 B1 | 8/2015 |
| JP | H10-155109 A | 6/1998 |
| JP | 2006-033570 A | 2/2006 |
| JP | 2011-523538 A | 8/2011 |
| JP | 2012-227679 A | 11/2012 |
| JP | 2015-037282 A | 2/2015 |
| KR | 1020150072439 | 6/2015 |
| WO | WO 2011/063347 A2 | 5/2011 |
| WO | WO 2013/006649 A2 | 1/2013 |
| WO | WO 2013043751 A1 | 3/2013 |
| WO | WO 2014062481 A1 | 4/2014 |

OTHER PUBLICATIONS

Office Action dated Dec. 30, 2019 in the parallel Chinese patent application No. 201680062022.8 (26 pages).

Office Action dated Mar. 5, 2019 in the parallel Korean patent application No. 10-2018-7008163 (13 pages).

Decision to Grant in the parallel Japanese patent application No. 2018-510470 dated Apr. 16, 2019.

* cited by examiner

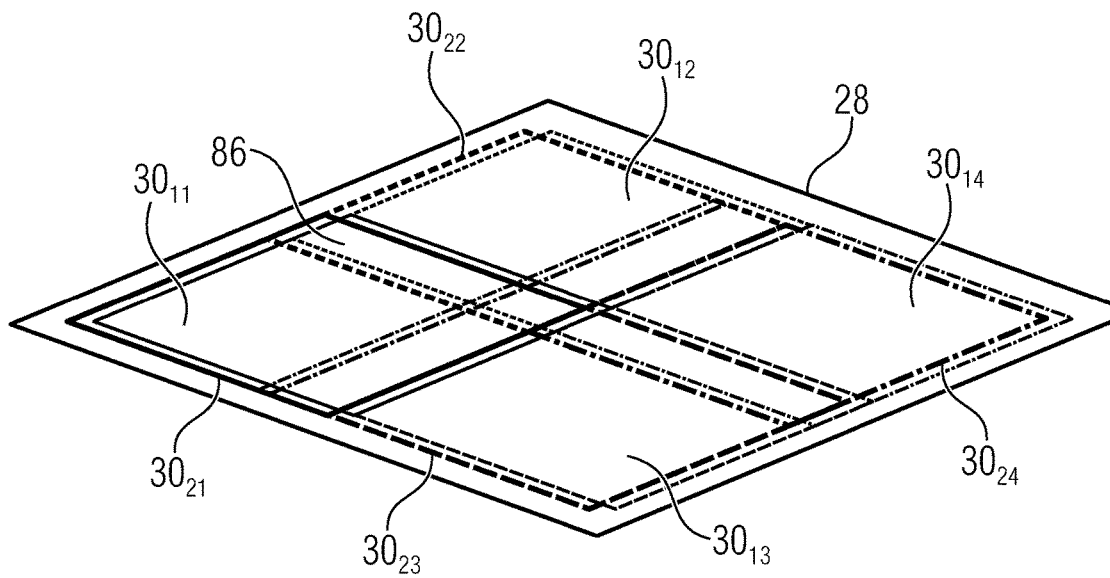
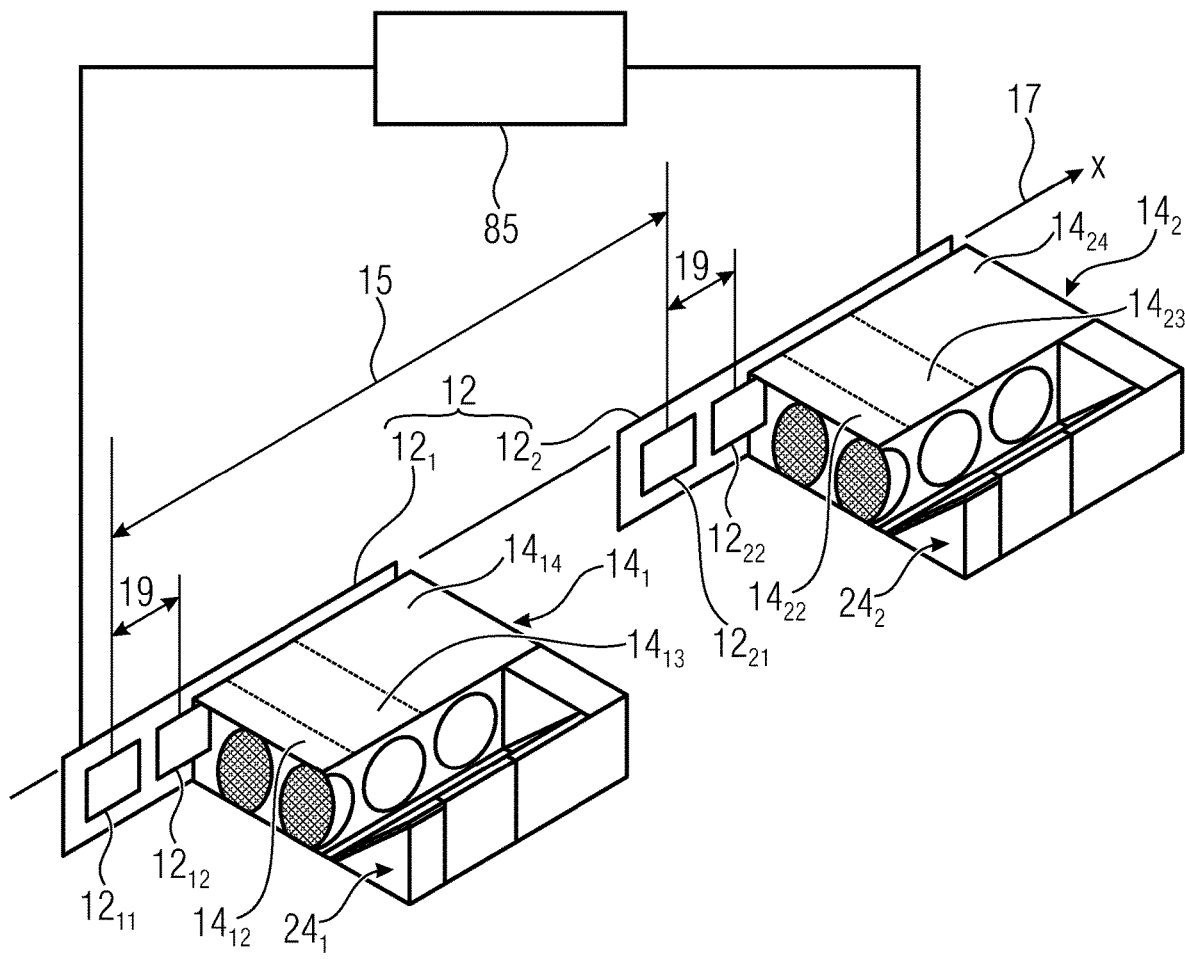
FIG 1

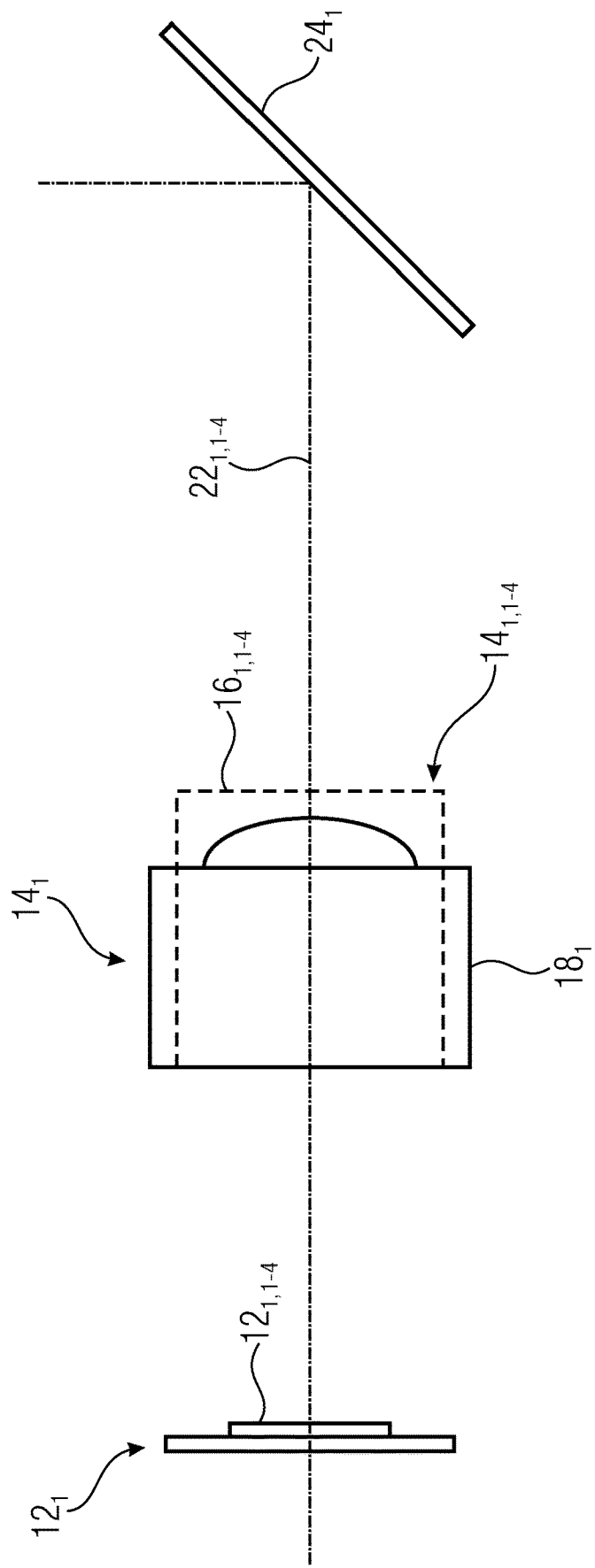

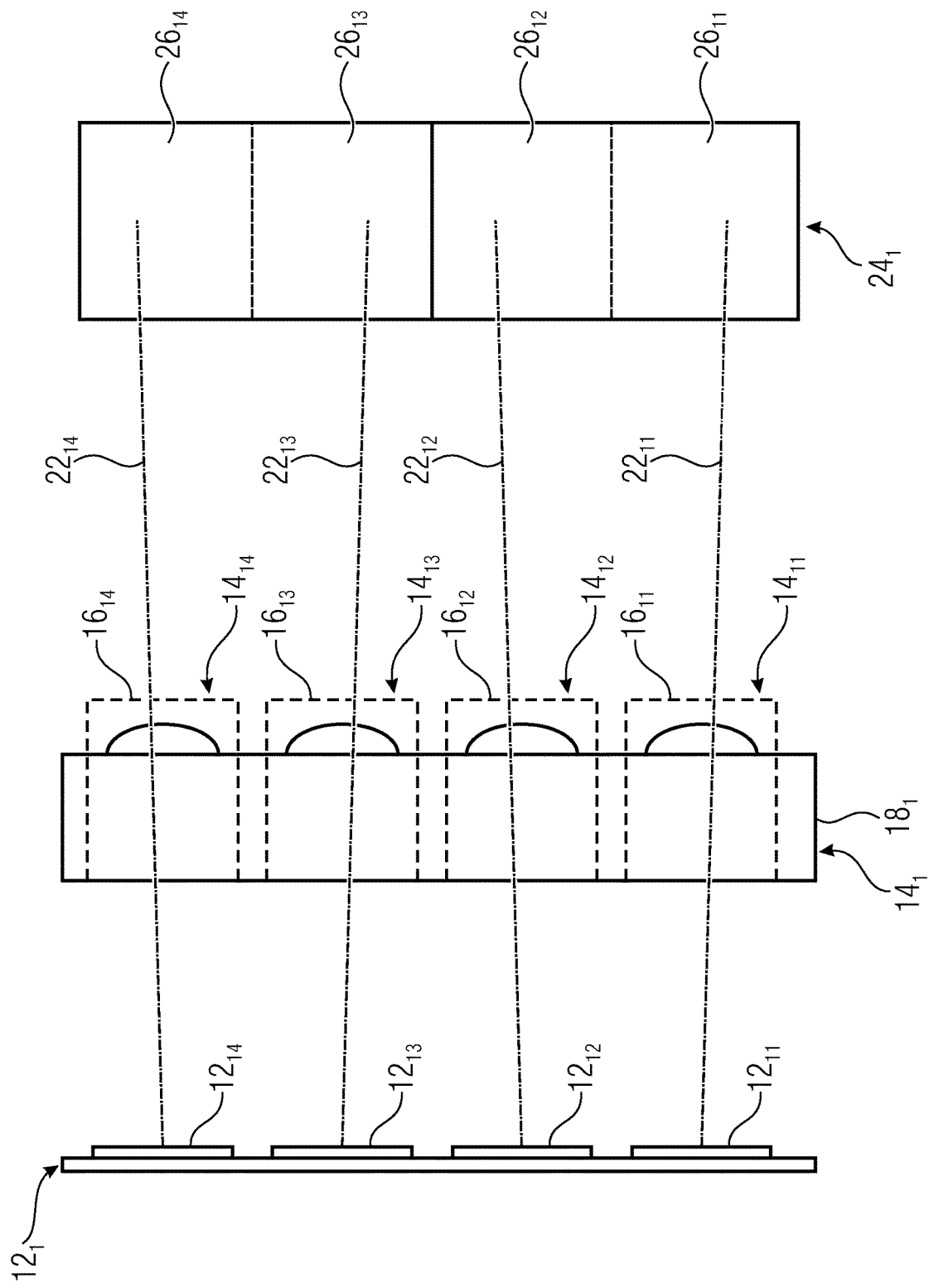

MULTI-APERTURE IMAGING DEVICE

CROSS-REFERENCE TO RELATED APPLICATIONS

This application is a continuation-in-part of U.S. patent application Ser. No. 15/903276 filed Feb. 23, 2018 which is a continuation of co-pending International Application No. PCT/EP2016/069821, filed Aug. 22, 2016, both of which are incorporated herein by reference in its entirety, and additionally claims priority from German Application No. DE 10 2015 216 140.4, filed Aug. 24, 2015, which is incorporated herein by reference in its entirety.

BACKGROUND OF THE INVENTION

The present application relates to a multi-aperture imaging device.

Multi-aperture imaging systems with linear channel arrangement consist of several juxtaposed imaging channels, each capturing only part of the object. The total image results from merging or fusing the individual partial images. Due to the finite distance of the imaging channels to one another, parallax occurs, which is in particular noticeable in short object distances and results in artifacts in the composite total images. Apart from that there are multi-aperture imaging systems where the individual channels each capture one and the same scene completely, wherein information on the depth of the object or the scene is calculated from the parallax between the channels.

Problems occur when high spatial or lateral resolution of the scene having a relatively wide field of view on the one hand and the generation of depth information on the other hand is desired with one and the same imaging system.

The present invention provides a 3D multi-aperture imaging device that allows obtaining high lateral resolution and/or a wide field of view, wherein additionally depth information can be derived.

SUMMARY

According to an embodiment, a multi-aperture imaging device for providing information on a scene may have: an image sensor; a first arrangement of optical channels having a first plurality of optical channels for projecting overlapping first partial fields of view of a total field of view on first image sensor areas of the image sensor; a second arrangement of optical channels for projecting at least a second partial field of view of the total field of view that overlaps with the first partial fields of view on second image sensor areas of the image sensor; wherein the first partial fields of view together cover the total field of view; a processor for fusing images that have been captured by the first arrangement of optical channels to a first total image, wherein the processor is configured to perform fusion in at least an overlap area of first partial fields of view of a pair of optical channels of the first plurality of optical channels by using disparities in a pair of images, wherein at least one of them has been captured by the second arrangement of optical channels whose projected second partial field of view overlaps at least with the overlap area.

Another embodiment may have a method for fusing images that have been captured by a multi-aperture imaging device including an image sensor, a first arrangement of optical channels having a first plurality of optical channels for projecting overlapping first partial fields of view of a total field of view on first image sensor areas of the image sensor and a second arrangement of optical channels for projecting at least a second partial field of view of the total field of view that overlaps with the first partial fields of view on second image sensor areas of the image sensor, wherein the first partial fields of view together cover the total field of view, the method including: fusing images that have been captured by the first arrangement of optical channels to a first total image, by performing fusion in at least an overlap area of first partial fields of view of a pair of optical channels of the first plurality of optical channels by using disparities in a pair of images, wherein at least one of them has been captured by the second arrangement of optical channels whose projected second partial field of view overlaps at least with the overlap area.

The present application is based on the finding that a multi-aperture imaging device can be provided which is, on the one hand, able to provide 3D information on a scene and, on the other hand, allows obtaining high lateral resolution and/or a wide field of view in that the multi-aperture imaging device is provided with a first plurality of optical channels for projecting overlapping first partial fields of view of a total field of view on first image sensor areas of an image sensor of the multi-aperture imaging device and with a second plurality of optical channels for projecting overlapping second partial fields of view of the total field of view on second image sensor areas of the image sensor, wherein the first and second pluralities of optical channels are arranged laterally offset from one another by a base distance, and when fusing images that have been captured by the first plurality of optical channels to a first total image in an overlap area of first partial fields of view of a pair of optical channels of the first plurality of optical channels, disparities in a pair of images are used, wherein one of them has been captured by one of the second plurality of optical channels. Thus, the total field of view is divided twice into merely partially overlapping partial fields of view, namely in the form of the first plurality of optical channels and the other time in the form of the second plurality of optical channels, whereby it is possible to obtain a desired lateral resolution and/or a desired width of the total field of view and to obtain parallax information across the total field of view. Fusing the images obtained by means of the first plurality of optical channels into a total image suffers less from parallax occurring between the channels of the first plurality of optical channels, since fusing the images that have been captured by the first plurality of optical channels into the first total image is supported by disparity information obtained by evaluating an image that has been captured by one of the channels of the second plurality of optical channels. In particular, it is possible to keep the lateral distances between the channels of the first plurality of optical channels low. The inevitably still occurring lateral distances result in parallax between the channels of the first plurality of channels. When fusing the images of the plurality of the first plurality of channels, the object distance dependency of the fusing of the images in the overlap area can be realized in an improved manner with respect to a procedure merely evaluating disparities among the images of the first plurality of optical channels, in that the disparities between images of a pair of images are used where one of them has been captured by one of the second plurality of optical channels. This can be a pair of images where one of them has been captured by the first and the other by the second plurality of channels or a pair of images where both have been captured by different channels from the first or the second pluralities of channels. However, disparities from more than one pair of images can be used for an overlap area. Among that could obviously be a pair of"

images where both of them have been captured by different channels from the second plurality of channels i.e. a pair of images that are to be fused.

BRIEF DESCRIPTION OF THE DRAWINGS

Embodiments of the present invention will be detailed subsequently referring to the appended drawings, in which:

FIG. 1 a partial schematic three-dimensional partial illustration of a 3D multi-aperture imaging device according to an embodiment;

FIGS. 5a and b side view and top view of a module of a 3D multi-aperture imaging device according to an embodiment where the optical axes have pre-divergence in the plane of the optical axes and the beam-deflecting device takes on the divergence in the other direction, whereby the number of facets of the deflecting device can be reduced and the inclinations can be limited to one direction.

DETAILED DESCRIPTION OF THE INVENTION

Figure 2:
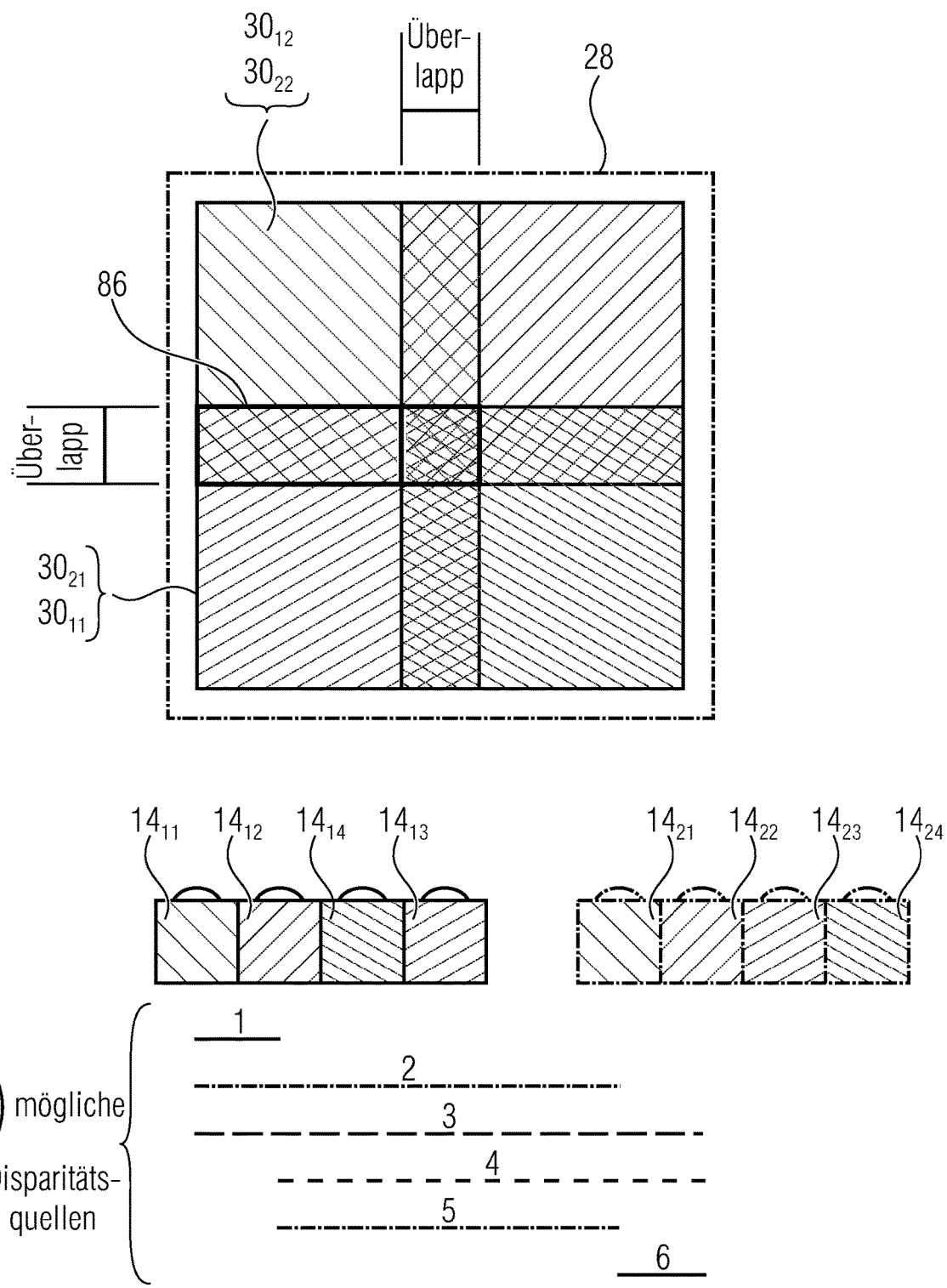
FIG. 2 a schematic illustration of the channels and their formation of sources of disparity for an overlap area of partial fields of view of channels whose images are to be melted.

FIG. 1 shows a 3D multi-aperture imaging device 10 according to an embodiment. The same has an image sensor that can be divided into two components $12_1$ and $12_2$, respectively, as indicated in FIG. 1, one component $12_1$ for the "right" optical channels $14_1$ and the other component $12_2$ for the "left" channels $14_2$. In the example of FIG. 1, the right and left optical channels $14_1$ and $14_2$ are structured identically, however, laterally offset from one another by a base distance 15 in order to obtain as much depth information as possible with respect to the scene within the field of view of the device 10. Thus, the elements provided with a reference number having an index 1 at the first position from the left belong to the first component 1 or a first module for the right channels, module 1, of the apparatus 10 and the elements provided with a reference number having an index 2 at the first position from the left belong to the second component 2 or a second module for the left channels, module 2, of the device 10. Although in FIG. 1 the number of modules is two, the device could also have more of them which are arranged at a respective base distance from one another with.

In the exemplary case of FIG. 1, each plurality $14_1$ and $14_2$ of optical channels includes four juxtaposed optical channels. The individual "right" channels are distinguished by the second subscript index. The channels are indexed from the right to the left, i.e. the optical channel $14_{11}$, not illustrated in FIG. 1 due to a partial omission for the purpose of clarity is for example, arranged at the outermost right edge along the base distance direction 17, along which the left and right channels are arranged offset from one another by the base distance 15, i.e. farthest apart from the plurality $14_2$ of left channels, wherein the other right channels $14_{12}$-$14_{14}$ follow along the base distance direction 17. Thus, channels $14_{11}$-$14_{14}$ form a single-line array of optical channels whose line extension direction corresponds to the base distance direction 17. The left channels $14_2$ are structured in the same way. They can also be distinguished by the second subscript index. The left channels $14_{21}$-$14_{24}$ are arranged beside one another and successively in the same direction as the right channels $14_{11}$-$14_{14}$ namely such that the channel $14_{21}$ is closest to the right channels and the channel $14_{24}$ is the farthest apart from the latter.

Each of the right channels $14_{11}$-$14_{14}$ includes respective optics which can consist, as indicated in FIG. 1, of a lens system. Alternatively, each channel could comprise a lens. Each optical channel $14_{11}$-$14_{14}$ captures one of overlapping partial fields of view of a total field of view 28 which overlap with one another and together cover the total field of view 28. The channel $14_{11}$ projects, for example, the partial field of view $30_{11}$ on an image sensor area $12_{11}$, the optical channel $14_{12}$ the partial field of view $30_{12}$ on an image sensor area $12_{12}$, the optical channel $14_{13}$ an allocated partial field of view $30_{13}$ on a respective image sensor area $12_{13}$ of the image sensor 12 not visible in FIG. 1 and the optical channel $14_{14}$ an allocated partial field of view $30_{14}$ on a respective image sensor area $12_{14}$ which is also not shown in FIG. 1 due to concealment.

In FIG. 1, the image sensor areas $12_{11}$-$12_{14}$ of the image sensor 12 or the component $12_1$ of the image sensor 12 are arranged in a plane parallel to the base distance direction 15 or parallel to the line extension direction 17, and the lens planes of the optics of the optical channels $14_{11}$-$14_{14}$ are also parallel to this plane. Additionally, the image sensor areas $12_{11}$-$12_{14}$ are arranged with a lateral inter-channel distance 19 to one another, with which the optics of the optical channels $14_{11}$-$14_{14}$ are also arranged in that direction, such that the optical axes and optical paths of the optical channels $14_{11}$-$14_{14}$ run parallel to one another between the image sensor areas $12_{11}$-$12_{14}$ and the optics $14_{11}$-$14_{14}$. Centers of the image sensor areas $12_{11}$-$12_{14}$ and optical centers of the optics of the optical channels $14_{11}$-$14_{14}$ are arranged, for example, on the respective optical axis that runs perpendicular to the above-mentioned common plane of the image sensor areas $12_{11}$-$12_{14}$.

The optical axes or optical paths of the optical channels $14_{11}$-$14_{14}$ are deflected by a beam-deflecting device $24_1$ and hence provided with a divergence, which has the effect that the partial fields of view $30_{11}$-$30_{14}$ of the optical channels $14_{11}$-$14_{14}$ only partly overlap, e.g. so that the partial fields of view $30_{11}$-$30_{14}$ overlap in pairs at the most by 50% as regards to the solid angle. As indicated in FIG. 1, the beam-deflecting device $24_1$ can have a reflective facet, for example, for each optical channel $14_{11}$-$14_{14}$, which are differently tilted with respect to one another among the channels $14_{11}$-$14_{14}$. An average inclination of the reflective facets with respect to the image sensor plane deflects the total field of view of the right channels $14_{11}$-$14_{14}$ in a direction that is, for example, perpendicular to the plane in which the optical axes of the optics of the optical channels $14_{11}$-$14_{14}$ run before and without beam deflection by the device $24_1$, respectively, or deviates from this perpendicular direction by less than 10°. Alternatively, the beam-deflecting device $24_1$ could also use prisms for beam deflection of the individual optical axes or optical paths of the optical channels $14_{11}$-$14_{14}$.

The beam-deflecting device $24_1$ provides the optical paths of the optical channels $14_{11}$-$14_{14}$ with a divergence such that the channels $14_{11}$-$14_{14}$ that are actually juxtaposed linearly in the direction 17 cover the total field of view 28 in a two-dimensional manner.

It should be noted that the optical paths or optical axes could also deviate from the described parallelism, but that the parallelism of the optical paths of the optical channels could still be so distinct that the partial fields of view that are covered by the individual channels $14_{11}$-$14_{14}$ or projected on the respective image sensor areas $12_{11}$-$12_{14}$ would largely overlap without any further measures, such as beam deflection, so that in order to cover a greater total field of view by the multi-aperture imaging device 10, the beam-deflecting device 24 provides the optical paths with additional divergence such that the partial fields of view of the channels $14_{11}$-$14_{14}$ overlap less with one another. The beam-deflecting device $24_1$, for example, has the effect that the total field of view has an aperture angle, averaged across all azimuth angles or all transversal directions, that is greater than 1.5 times the respective average aperture angle of the partial fields of view of the optical channels $14_{11}$-$14_{14}$.

The left channels $14_{21}$-$14_{24}$ are structured the same way as the right channels $14_{11}$-$14_{14}$ and positioned in relation to respectively allocated image sensor areas $12_{21}$-$12_{24}$, wherein the optical axes of the optical channels $14_{21}$-$14_{24}$ running parallel to one another in the same plane as the optical axes of channels $14_{11}$-$14_{14}$ are deflected by a corresponding beam-deflecting device $24_2$, such that the optical channels $14_{21}$-$14_{24}$ capture the same total field of view 28 in an almost congruent manner, namely in partial fields of view $30_{21}$-$30_{24}$ into which the total field of view 28 is divided two-dimensionally, which overlap one another, and where each of them overlaps almost completely with the respective partial field of view $30_{11}$-$30_{14}$ of a respective channel of the right channels $14_{11}$-$14_{14}$. For example, partial field of view $30_{11}$ and partial field of view $30_{21}$, partial fields of view $30_{12}$ and $30_{22}$, etc. overlap almost completely.

The image sensor areas $12_{11}$-$12_{24}$ can, for example, each be formed of a chip including a respective pixel array, wherein the chips can be mounted on a common substrate or a common board or in groups on several boards, as indicated in FIG. 1, for the case of separately placing the chips of the image sensor areas $12_{11}$-$12_{14}$ of the component $12_1$ on a board and the chips of the image sensor areas $12_{21}$-$12_{24}$ of the component $12_2$ on a further board. Alternatively, it would also be possible that the image sensor areas $12_{11}$-$12_{24}$ are formed together or in groups, such as separated according to allocation to the component $12_1$ and $12_2$, from part of a common pixel array extending continuously across the respective image sensor areas, wherein the common pixel array is formed, for example, on a single chip. Then, for example, merely the pixel values of the common pixel array are read out at the respective image sensor areas. Different combinations of these alternatives are also possible, such as the presence of a chip for two or more channels and a further chip for different channels or the like within a component $12_1$ and $12_2$.

In addition to the above-mentioned components, the 3D multi-aperture imaging device includes a processor 85 performing the task of fusing the images that have been captured by the right optical channels $14_{11}$-$14_{14}$ during capturing by the 3D multi-aperture imaging device 10 to a first total image. The problem to be overcome is the following: Due to the inter-channel distances 19 between adjacent channels of the right channels $14_{11}$-$14_{14}$, the images that have been captured during capturing by channels $14_{11}$-$14_{14}$ in image areas $12_{11}$-$12_{14}$ cannot be simply or translationally shifted with respect to one and placed onto one another. In other words, the same cannot be easily fused. The lateral offset along the direction 15, 17 or 19 in images of the image sensor areas $12_{11}$-$12_{14}$ when capturing the same scene that correspond to one another but reside within different images is called disparity. The disparity of corresponding image contents depends again on the distance of this image content within the scene, i.e., the distance of the respective object from the device 10. The processor 85 could now try to evaluate disparities among the images of the image sensor areas $12_{11}$-$12_{14}$ itself in order to fuse these images to a first total image, namely a "right total image". However, it is a disadvantage that the inter-channel distance 19 exists and, hence, only causes the problem, but that the inter-channel distance 19 is, on the other hand, relatively low such that the depth resolution or estimation is merely inaccurate. Thus, the attempt of determining corresponding image contents in an overlap area between two images, such as in the overlap area 86 between the images of the image sensor areas $12_{11}$ and $12_{12}$, for example by means of correlation, is difficult.

Thus, for fusing, the processor of FIG. 1 uses, in the overlap area 86 between the partial fields of view $30_{11}$ and $30_{12}$, disparities in a pair of images where one of them has been captured by one of the left channels $14_{21}$ or $14_{22}$, whose projected second partial field of view, namely $30_{21}$ or $30_{22}$, overlaps with the overlap area 86. For example, for fusing the images of the image sensor areas $12_{11}$ and $12_{12}$, the processor 85 evaluates disparities in the images, wherein one of them has been captured by one of the image sensor areas $12_{21}$ or $12_{22}$ and another one by a channel involved in the overlap area 86, i.e., an image that has been captured by one of the image sensor areas $12_{11}$ or $12_{12}$. Then, such a pair has a base distance 15 of basic base distance plus/minus one or no channel base distance 19.

The latter base distance is significantly greater than a single channel base distance 19, which is why disparities in the overlap area 86 are easier to determine for the processor 85. Thus, for fusing the images of the right channels, the processor 85 evaluates disparities that result with an image of the left channels and advantageously, but not exclusively, between images from one of the right channels and one of the left channels.

More specifically, it is possible that the processor 85 adopts that part of the partial field of view $30_{11}$ that does not overlap with one of the other partial fields of view of the right channels more or less directly from the image $12_{11}$ and performs the same for the non-overlapping areas of the partial fields of view $30_{12}$, $30_{13}$ and $30_{14}$ based on the images of the image sensor areas $12_{12}$-$12_{14}$, wherein the images of the image sensor areas $12_{11}$-$12_{14}$ are captured, for example, at the same time. Merely in the overlap areas of adjacent partial fields of view, such as the partial fields of view $30_{11}$ and $30_{12}$, the processor 85 uses disparities of image pairs whose overlap in the total field of view 28 overlaps in the overlap area but from which the plurality but not only one has been captured by one of the right channels and the other one by one of the left channels, again, e.g., at the same time.

According to an alternative procedure, it would also be possible that the processor 85 warps all images of the right channel, according to an evaluation of disparities between pairs of images wherein one of them has been captured by the right channels and the other one by the left channels. In this way, the total image calculated by the processor 85 for the images of the right channels could be warped virtually not only in the overlap area of the partial fields of view $30_{11}$-$30_{14}$ of the right channels but also in the non-overlap area virtually on a focus which is, for example, laterally in the center between the right channels $14_{11}$-$14_{14}$, in that even for those areas of the partial fields of view $30_{11}$-$30_{14}$ that do not overlap, disparities of image pairs are evaluated by the processor 85, wherein one image has been captured by one of the right channels and another image by one of the left channels.

The 3D multi-aperture imaging device 10 of FIG. 1 is not only able to generate a total image from the images of the right channels, but the 3D multi-aperture imaging device 10 of FIG. 1 is also able, at least in one operating mode, to generate from a captured image, in addition to the total image of the first channels, also a total image of the images of the left channels and/or in addition to the total image of the right channels, a depth map.

According to the first alternative, the processor 85 is configured, for example, to fuse images that have been captured by the left optical channels $14_{21}$-$14_{24}$ and the image sensor areas $12_{21}$-$12_{24}$, respectively, to a second total image, namely a total image of the left channel and to use, in an overlap area of laterally adjacent partial fields of view $30_{21}$-$30_{24}$ of the left optical channels, disparities in a pair of images of which the plurality but not only one have been captured by the right optical channels $14_{11}$-$14_{14}$ and overlaps with the respective overlap area of the pair of partial fields of view $30_{21}$-$30_{24}$, and the other one may be captured by one of the left optical channels whose partial field of view overlaps with the respective overlap area.

According to the first alternative, the processor 85 outputs two total images for one capturing, namely one for the right optical channels and the other for the left optical channels. These two total images could be supplied separately to a user, for example to the two eyes of the user and, hence, result in a three-dimensional impression of the captured scene.

According to the other above-mentioned alternative, the processor 85 generates, in addition to the total image of the right channels, a depth map by using disparities in pairs of images comprising at least one pair for each of the right channels $14_{11}$-$14_{14}$ which comprises one image that has been captured by the respective right channel and another image that has been captured by one of the left channels.

In the embodiment where the depth map is generated by the processor 85, it is also possible to perform the above-mentioned warping for all of the images that have been captured by the right channels based on the depth map. Since the depth map comprises depth information across the total field of view 28, it is possible to warp all of the images that have been captured by the right channels, i.e., not only in the overlap areas of the same but also in the non-overlap areas onto a virtual common aperture point and a virtual optical center, respectively.

The two alternatives can also be processed both by the processor 85: The same could first generate the two total images, namely one for the right optical channels and the other one for the left optical channels, as described above, by using, when fusing the images of the right channels in the overlap areas between the images of the right channels, also disparities from pairs of images where one of them belongs to the images of the left channels, and when fusing the images of the left channels in the overlap areas between the images of the left channels, also disparities from pairs of images where one of them belongs to the images of the right channels, and then generate, from the total images gained in that way that represent the scene in the total field of view from different perspectives, a total image with allocated depth map, such as a total image which lies between the optical centers of the optics of the right and left optical channels, but possibly not only centered between the same, for a virtual view or for a virtual optical center. For calculating the depth map and for warping one of the two total images or warping and fusing both total images into the virtual view, the processor 85 used the right and left total image, virtually as an intermediate result of the previous fusing of the left and right individual image, respectively. Here, the processor evaluated disparities in both intermediate result total images in order to obtain the depth map and to perform warping or warping/fusing of the same.

It should be noted that the processor performs evaluation of disparities in a pair of images, for example by means of cross-correlation of image areas.

FIG. 2 also shows that the processor 85 can use, as a base for fusing images that have been captured by a pair of image sensors, onto which a pair of optics of the left channels projects a pair of immediately adjacent partial fields of view, as it is exemplarily the case for the partial fields of view $30_{11}$ and $30_{12}$, apart from this pair of images, disparities in one or several additional ones of the all-in-all $$\binom{4}{2},$$

i.e., "two out of four" sources of disparity, i.e., pairs of images of image sensor areas concerning disparities of scene objects in the overlap area between this pair of immediately adjacent partial fields of view. In FIG. 2, this is indicated exemplarily for the cross-shaded overlap area between the partial fields of view $30_{11}$ and $30_{12}$: Apart from the pair of images of the right channels $14_{11}$ and $14_{12}$ (disparity source 1) themselves that are to be fused, four pairs of images exist, one of which is projected by a right channel and one by a left channel on a respective image sensor area and captured by the latter (disparity source 2, 3, 4, 5), namely images that are captured by means of channels $14_{11}$ and $14_{21}$ (disparity source 2), images that are captured by means of channels $14_{11}$ and $14_{22}$ (disparity source 3), images that are captured by means of channels $14_{12}$ and $14_{22}$ (disparity source 4) and images that are captured by means of channels $14_{12}$ and $14_{21}$ (disparity source 5). Further, a pair of images exists, both of which are projected by a left channel on a respective image sensor area and captured by the latter (disparity source 6, pairing of $14_{21}$ and $14_{22}$). The processor can use one or several of the additional sources 3 to 5 for fusing support. If, according to the above stated alternative, the processor 85 also calculates a depth map for the total field of view 28, the processor can determine, according to the procedure for image fusing, the depth map at each point of the field of view 28 from the evaluation of disparities of more than one pair of images, one of which is projected by a right channel and one by a left channel on a respective image sensor area and captured by the latter, namely at points where, apart from the partial field of view of a right channel and the partial field of view of a left channel, another pair overlaps as well. In FIG. 2, this is merely the case at the overlap areas of partial fields of view of right channels that are identical to the overlap areas of partial fields of view of left channels due to the congruency with the partial fields of view of left channels, but in other embodiments this congruency might not exist.

It should be mentioned that in a different coverage of the total field of view 28 by the partial fields of view of the left channel on the one hand and by the partial fields of view of the right channels on the other hand, possibly more than four channels (not considering their allocation to the left or right channels) overlap with one another, as it was also the case, for example, at the mutual overlap between the overlap areas of partial fields of view of the previous examples in line direction or column direction, where the partial fields of view of the right channels as well as the partial fields of view of the left channels were each arranged in columns and rows. Then, it applies in general for the number of disparity sources that the same is $$\binom{N}{2},$$

wherein N refers to the number of channels with overlapping partial fields of view.

In addition to the above description, it should be mentioned that the processor 85 optionally also performs, among others, channel-wise correction of perspective projecting faults of the respective channel.

It should be noted that the embodiment of FIG. 1 was merely exemplarily in many ways. This relates, for example, to the number of optical channels. The number of right optical channels is, for example, not four, but is in any way greater than/equal to 2 or lies between 2 and 10, both inclusive, and the overlap area of the partial fields of view of the right optical channels, as long as for each partial field of view or each channel the pair with the greatest overlap for the respective partial field of view is considered, can lie, for all these pairs, as regards to the area, between ½ and 1/1000 of an average image size of the images that have been captured by the image areas $12_{11}$-$12_{14}$, measured for example in the image plane, i.e. the plane of the image sensor areas. The same applies, for example, for the left channels. The number, however, can differ between the right channels and the left channels. This means that the number of left optical channels $N_L$, and of the right optical channels $N_R$ does not have to be the same and a division of the total field of view 28 into the partial fields of view of the left channels and the partial fields of view of the right channels does not have to be approximately the same as it was the case in FIG. 1. Concerning the partial fields of view and their overlap, it can be such that the partial fields of view project into one another, for example by at least 20 pixels as long as an image distance or object distance of 10 m is considered, at least for all pairs having the greatest overlap, wherein this can apply for both the right channels and the left channels.

Contrary to the above statements, it is furthermore not necessary that the left optical channels and the right optical channels, respectively, are formed in a single line. The left and/or the right channels can also form a two-dimensional array of optical channels. Additionally, it is not necessitated that the single-line arrays have a collinear line extension direction. However, the arrangement of FIG. 1 is advantageous since the same results in a minimum installation height perpendicular to the plane where the optical axes of the optical channels, i.e. both the right and left channels run before and without beam-deflection, respectively. Concerning the image sensor 12, it has already been mentioned that the same can be formed of one, two or several chips. For example, one chip per image sensor area $12_{11}$-$12_{14}$ and $12_{21}$-$12_{24}$ could be provided, wherein in the case of several chips the same can be mounted on one or several boards, such as one board for the left channels or the image sensors of the left channels and one board for the image sensors of the right channel.

Thus, in the embodiment of FIG. 1 it is possible to place adjacent channels within the channels of the right or left channels as densely as possible, wherein in the optimum case the channel distance 19 corresponds to the lens diameter. This results in a low channel distance and, hence, in a low disparity. The right channels on the one hand and the left channels on the other hand can also be arranged at any distance 15 to one another, such that great disparities can be realized. All in all, the option of artefact-reduced or even artefact-free image fusion and the generation of depth maps with a passive optical imaging system results.

Contrary to the above examples, it would be possible to use more than two groups of channels $14_1$ and $14_2$. The number of groups could be referred to by N. If in this case the number of channels per group were the same as well as the total field of view division into partial fields of view for all groups were the same, a number of disparity sources of $$\binom{2N}{2},$$

for example, would result per overlap area of partial fields of view of the group $14_1$. However, a different total field of view division for the groups of channels is also possible as has been mentioned above.

Finally, it should be noted that in the above description merely the exemplary case has been stated that the processor 85 fuses the images of the right channels. The same procedure could also be performed by the processor 85, as mentioned above, for both and all channel groups, respectively, or also for the left or the like.

The 3D multi-aperture imaging device of FIG. 1 can be installed, for example, in a flat housing of a mobile device, such as a mobile phone. Here, the plane of the image sensor areas $12_{11}$-$12_{14}$ and $12_{21}$-$12_{24}$, as well as any lens plane of the optics of the left and right channels can run parallel to a thickness direction of the flat housing. Due to the beam-deflection by the beam-deflecting device $24_1$ and $24_2$, respectively, the total field of view of the 3D multi-aperture imaging device would be, for example, in front of a front side where, for example, a screen of the mobile device is positioned, or in front of a rear side of the mobile device.

Figure 3:
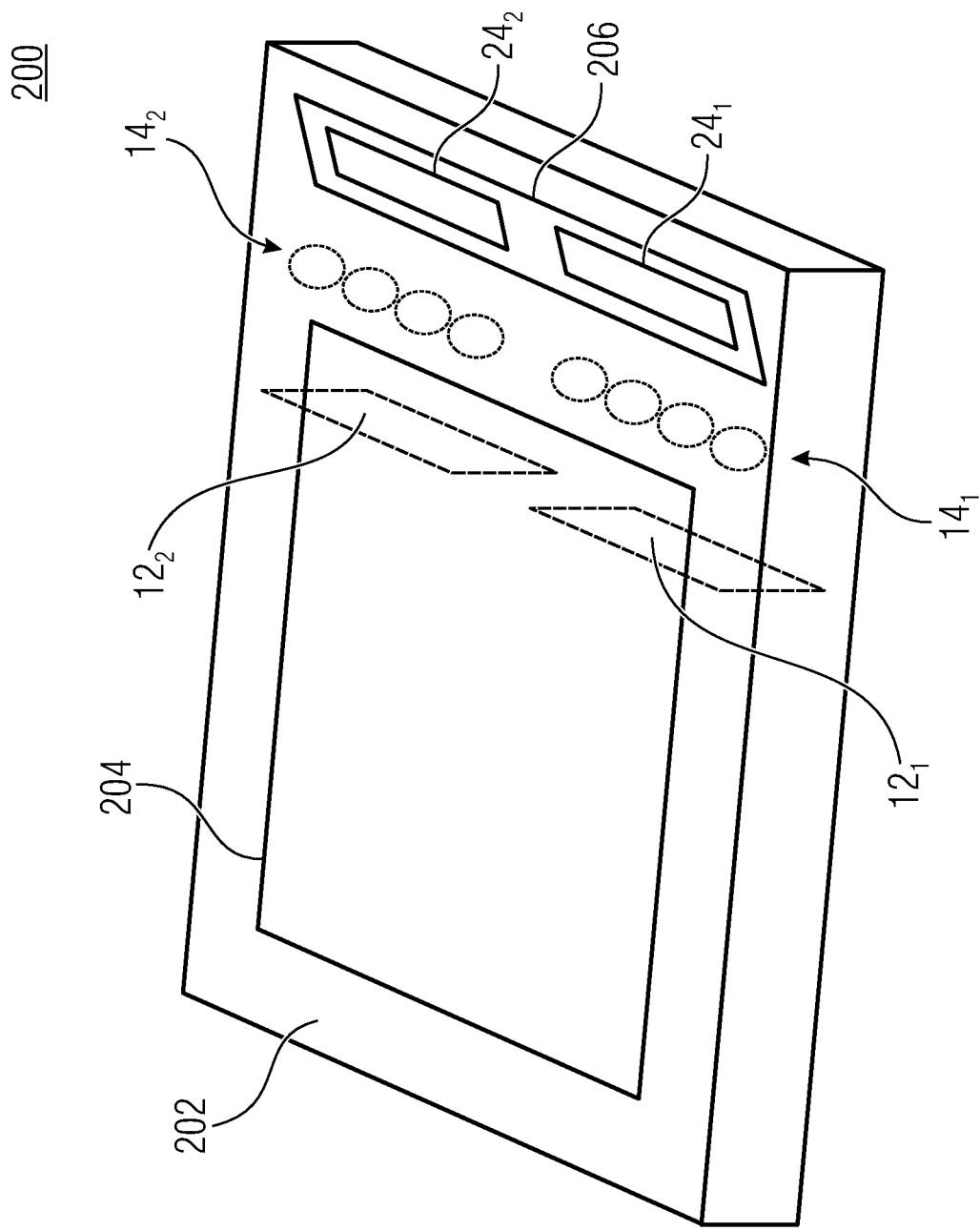
FIG. 3 a perspective view of a mobile device for illustrating an installation of the 3D multi-aperture imaging device.

FIG. 3 illustrates, for example, how the device 10 of the above-described alternatives is installed, for example, in a flat housing of a portable device 200, which can be, for example, one of a mobile phone, a smartphone or a media player or the like. The plane of the image sensor areas of parts $12_1$ and $12_2$ and the lens planes of the optics of the channels $14_1$ and $14_2$ are oriented perpendicular to the flat extension direction of the flat housing and parallel to the thickness direction, respectively. In that way, for example, the beam-deflecting device $24_1$ and $24_2$, respectively, would have the effect that the total field of view of the multi-aperture imaging device 10 lies in front of a front side 202 of the flat housing which, for example, also comprises a screen. Alternatively, deflection would also be possible in that way that the field of view is in front of a rear side of the flat housing which is opposite to the front side 202. The housing could have a transparent window 206 in the penetrated side 202 in order to let the optical paths of the group of optical channels $14_1$ and $14_2$ pass. The housing of the device 200 or the device itself can be flat, since due to the illustrated location of the device 10 in the housing, the installation height of the device 10 which is parallel to the thickness of the housing can be kept low. Installation of the device 10 in another, possibly non-portable device, such as a car, would also be possible.

Concerning the beam-deflecting device $24_1$ and $24_2$, respectively, it should be noted that the same present an optional element. The divergence of the optical paths of the optical channels, i.e. the right channels between themselves on the one hand and the left channels between themselves on the other hand could also be generated in a different manner than by using a respective beam-deflecting device $24_1$-$24_2$. The optical centers of the optics of the optical channels could, for example, be laterally offset to the allocated image sensor areas in order to generate a merely partial, i.e., incomplete overlap of the partial fields of view between the left channels on the one hand and between the right channels on the other hand.

For illustrating this further, FIG. 4 shows again a specific example for the configuration according to FIG. 1, wherein, in each module 1 and 2, the respective deflecting means $24_1$ and $24_2$, respectively, generates the divergence from optical axes $21_1$ and $22_2$, respectively, of optical channels $14_{1\#}$ and $14_{2\#}$, respectively, that are parallel to one another at first. For the sake of simplicity, FIG. 4 illustrates merely the module 1 with the right channels, but the illustration and description applies accordingly to module 2.

Figure 4:
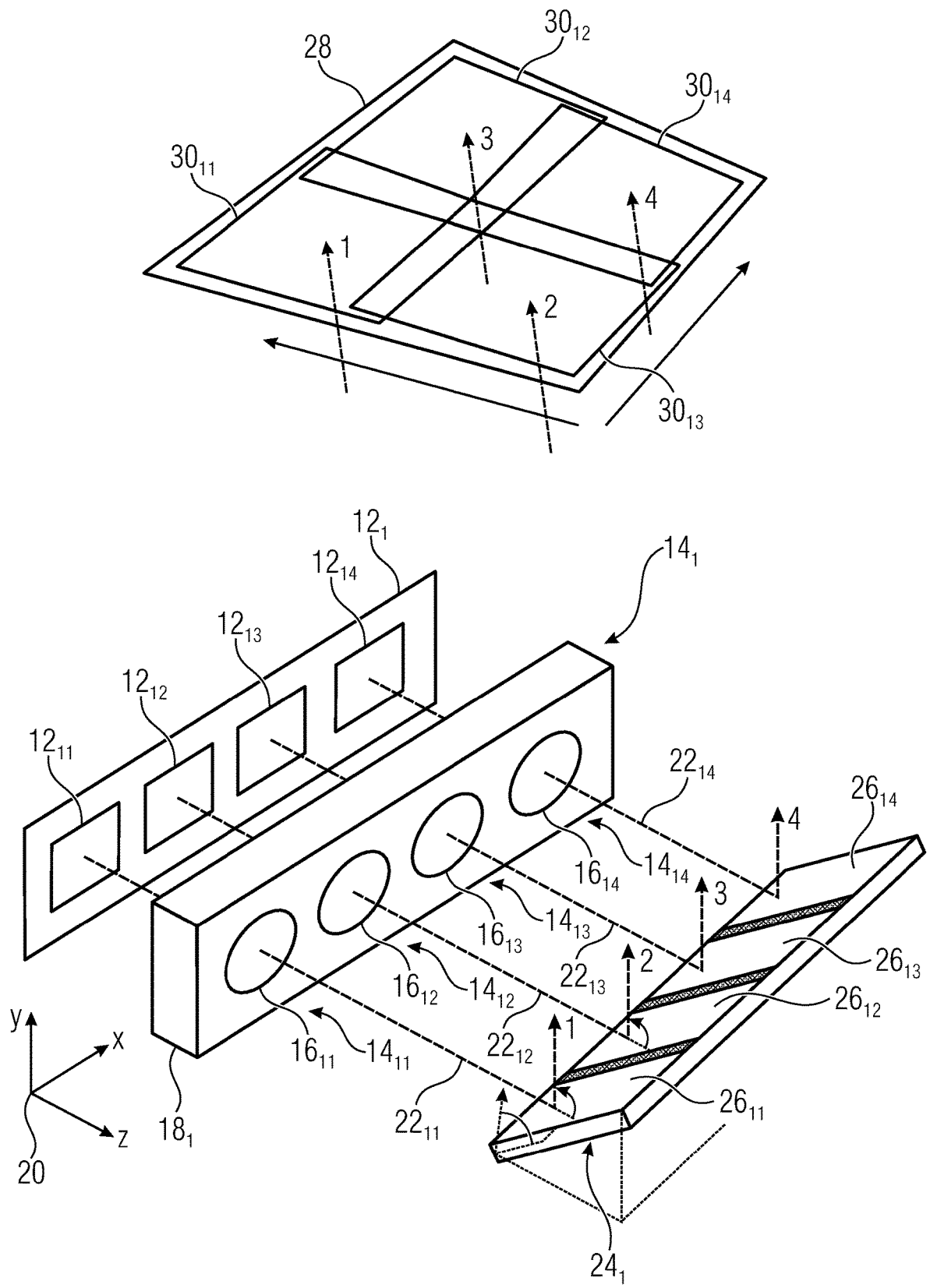
FIG. 4 a three dimensional illustration of a module of a 3D multi-aperture imaging device according to an embodiment where the optics are exemplarily supported by a transparent substrate penetrated by the optical paths.

FIG. 4 shows that each optical channel $14_{11}$, $14_{12}$, $14_{13}$, $14_{14}$ projects, by means of the allocated optics $16_{11}$-$16_{14}$ the respective channel-individual section $30_{11}$-$30_{14}$ of the total field of view 28 onto the respective image sensor area $12_{11}$, $12_{12}$, $12_{13}$ and $12_{14}$, respectively, of the image sensor $12_1$. Optics $16_{11}$ to $16_{14}$ consist, for example, each of a lens or a group of lenses that can be held, as shown in FIG. 4, by a common holder $18_1$. The holder $18_1$ is exemplarily formed of transparent material and is penetrated by the optical paths of the optical channels, but there are also other alternatives for holders. The image sensor areas $12_{11}$-$12_{14}$ are arranged in a common plane, namely the image plane of the optical channels $14_1$. In FIG. 4, this plane is exemplarily parallel to the plane that is spanned by an x- and an y-axis of a Cartesian coordinate system which is drawn in FIG. 1 for simplifying the following description and provided with reference number 20. In one embodiment, this would be the same plane where the image sensor areas $12_{21}$ to $12_{24}$ lie. The optics $16_{11}$-$16_{14}$ are, for example, also juxtaposed in a plane parallel to the image sensor 12, i.e., parallel to the xy-plane. In the example of FIG. 4, the relative positions of the image sensor areas $12_{11}$-$12_{14}$ in the image sensor plane are additionally positioned congruently to the relative position of optics $16_{11}$-$16_{14}$ and optics $16_{11}$-$16_{14}$ along the x and y axis, i.e., laterally in relation to the image sensor $12_1$ such that optical centers of optics $16_1$-$16_4$ are arranged in a centered manner with respect to the centers of the image sensor areas $12_{11}$ to $12_{14}$. This means that in the example of FIG. 4, optical axes $22_{11}$-$22_{14}$ of the optical channels $14_{11}$-$14_{14}$ run, at first, parallel to one another and parallel to the z-axis of the coordinate system 20, with respect to which optical axes the image sensor areas $12_{11}$-$12_{14}$ and the optics $16_{11}$t-$16_{14}$ are positioned in a centered manner. According to an embodiment, the plane of the optical centers would be the same again between modules 1 and 2. The optionally existing substrate $18_1$ could be provided separately for each module or could support the optics of both modules. It is possible that the device comprises one or several means that are able to change a relative location of optics $16_{11}$-$16_{14}$ with respect to the image sensor areas $12_{11}$-$12_{14}$ in a lateral direction, i.e., in x and/or y direction, for example for image stabilization. Optics $16_{11}$-$16_{14}$ project objects in a scene in the total field of view 28 on the allocated image sensor areas $12_{11}$-$12_{14}$ and for that purpose, the same are positioned at a respective distance from the image sensor $12_1$. While this distance could also be fixed, alternatively, a means for changing this image sensor/optics distance could be provided, such as for manual or automatic change of focus. The beam-deflecting device $24_1$ deflects the optical paths and the optical axes $22_{11}$-$22_{14}$, respectively, of the plurality of optical channels 14, such that the total field of view 28 is not in the direction of the z-axis but somewhere else. FIG. 4 represents the exemplary case that the total field of view 28 is essentially along the y-axis after deflection, i.e., the deflection is performed essentially in the zy-plane. Now, as described above, in the embodiment of FIG. 4, the optical axes $22_{11}$-$22_{14}$ are parallel to one another before and without the deflection by the beam-deflecting device $24_1$, respectively, and, for example, at the optics $16_{11}$-$16_{14}$, respectively. The corresponding centered positioning of optics $16_{11}$-$16_{14}$ as well as the image sensor areas $12_{11}$-$12_{14}$ is easy to produce and favorable with regard to minimizing the installation space. However, parallelism of the optical paths of the optical channel also has the effect that the partial fields of view that are covered by the individual channels $14_{11}$-$14_{14}$ and are projected on the respective image sensor areas $12_{11}$-$12_{14}$, respectively, would overlap almost completely without any further measures, such as beam deflection. In order to cover a greater total field of view 28, another function of the beam-deflecting device $24_1$ of FIG. 4 is to provide the optical axes of the optical path with divergence, i.e., to deflect the optical paths such that the partial fields of view $30_{11}$-$30_{14}$ of the channels $14_{11}$-$14_{14}$ overlap less with one another. In the example of FIG. 4, for this, the facets $26_{11}$-$26_{14}$ of the beam-deflecting device $24_1$ allocated to the individual optical channels have different inclinations with respect to one another or relative to the image sensor $12_1$, namely inclinations both around the x-axis and perpendicular thereto.

It has been noted above that the optical paths and optical axes, respectively, can deviate from parallelism before and without beam deflection, respectively. This circumstance will be described below in that the channels can be provided with some sort of pre-divergence of the optical axes. With this pre-divergence of the optical axes $22_{11}$-$22_{14}$, it would be possible that, for example, not all facet inclinations differ but that some groups of channels have for example, the facets with the same inclination. The latter can then be formed integrally or continuously merging with one another as one facet, so to speak, which is allocated to this group of channels that are adjacent in line extension direction. The divergence of the optical axes of these channels could then originate from the divergence of these optical axes as it is obtained by lateral offset between optical centers of the optics and image sensors areas of the channels. The pre-divergence could be limited, for example, to one plane. The optical axes could, for example, run in a common plane before and without beam deflection, respectively, but divergent within the same and the facets effect merely additional divergence, i.e., deflection or change of direction in the other transversal plane, i.e., they are all inclined parallel to the line extension direction and with respect to one another only differing from the above-mentioned common plane of the optical axes, wherein again several facets can have the same inclination or can be allocated together to a group of channels whose optical axes differ, for example, already in the above-mentioned common plane of the optical axes in pairs before and without beam deflection, respectively.

The mentioned possibly existing pre-divergence can be obtained, for example, in that the optical centers of the optics lie on a straight line along the line extension direction, while the centers of the image sensor area are arranged deviating from the projection of the optical centers along the normal of the plane of the image sensor areas on points of a straight line in the image sensor plane, such as at points deviating from the points on the above-mentioned straight line in the image sensor plane in a channel-individual manner along the line extension direction and/or along the direction perpendicular to both the line extension direction and the image sensor normal. Alternatively, pre-divergence can be obtained in that the centers of the image sensors lie on a straight line along the line extension direction, while the centers of the optics are arranged deviating from the projection of the optical centers of the image sensors along the normal of the planes of the optical centers of the optics on points on a straight line in the optic center plane, such as at points deviating from the points on the above-mentioned straight line in the optics center plane in a channel-individual manner along the line extension direction and/or along the direction perpendicular to both the line extension direction and the normal of the optical center plane. The above-mentioned channel-individual deviation from the respective projection may merely run in line extension direction, i.e., merely the optical axes that are in a common plane are provided with a pre-divergence. Then, both optical centers and image sensor area centers are on a straight line parallel to the line extension direction but with different intermediate distances. In contrast, a lateral offset between lenses and image sensors in perpendicular lateral direction to the line extension direction has resulted in an increase of the installation height. A pure in-plane offset in line extension direction does not change the installation height but possibly less facets result and/or the facets only have a tilting in an angular orientation which simplifies the structure. This is illustrated in FIG. 5a and FIG. 5b, where adjacent channels $14_{11}$ and $14_{2}$ on the one hand and adjacent channels $14_{13}$ and $14_{14}$ comprise optical axes $22_{11}$ and $22_{12}$ and $22_{13}$ and $22_{14}$, respectively running in the common plane, each squinting with respect to one another, i.e., provided with a pre-divergence. The facets $26_{11}$ and $26_{12}$ can be formed by one facet and the facets $26_{13}$ and $26_{14}$ can be formed by a different facet as indicated by dotted lines between the respective pairs of facets, and the only two facets are merely inclined in one direction and both parallel to the line extension direction.

It should be noted that, as an alternative to FIG. 5a and FIG. 5b, also the optical channels 1 and 2 could run convergent to one another as well as the channels 3 and 4, and the two pairs again divergent to one another, wherein again all optical axes run within one plane. In this way, the facets can be made smaller in the line extension direction.

Again, it should be noted that FIGS. 4 and 5a,b show merely one module for clarity reasons, but that the respective other module can be structured in the same way. Further, it should be mentioned again that the number of channels per module is not limited to four.

Further, it could be provided that in one module some optical channels are allocated to the same partial field of view, such as for the purpose of super-resolution and for increasing the resolution, respectively, by which the respective partial field of view is sampled by these channels. The optical channels within such a group would then run, for example, parallel before beam deflection and would be deflected by a facet onto a partial field of view. Advantageously, pixel images of the image sensor of a channel of a group would lie in intermediate positions between images of the pixels of the image sensor of another channel of this group. Accordingly, the total field of view would, in the sense of a spatial resolution and not in the sense of a number per pixel, not be sampled by the modules such that each channel captures its part of the total field of view, i.e. its partial field of view, with the full resolution but only with a reduced one. Only the usage of the pixel offset would result in a total image having a higher resolution, where each partial field of view would comprise more pixels than the images of the channels capturing this partial field of view considered individually and not the same amount as above. The depth map, however, would only be obtained with the reduced resolution and not as above with the total image resolution and a depth value, respectively, and depth map pixels per pixel of the total image, respectively, and the total images, respectively. Further, for the beam-deflecting device and the image sensor, the same applies as mentioned above with respect to the optic substrate, namely that modules 1 and 2 can also share a respective element. For image stabilization purposes, the beam-deflecting device could be rotatable around an axis parallel to the x-axis. Together with the translational movement of the optics along the x-axis, this results in image stabilization of the total field of view in two directions, wherein focus control can be realized via translational movement of the optics along the z-axis.

Figure 6A:
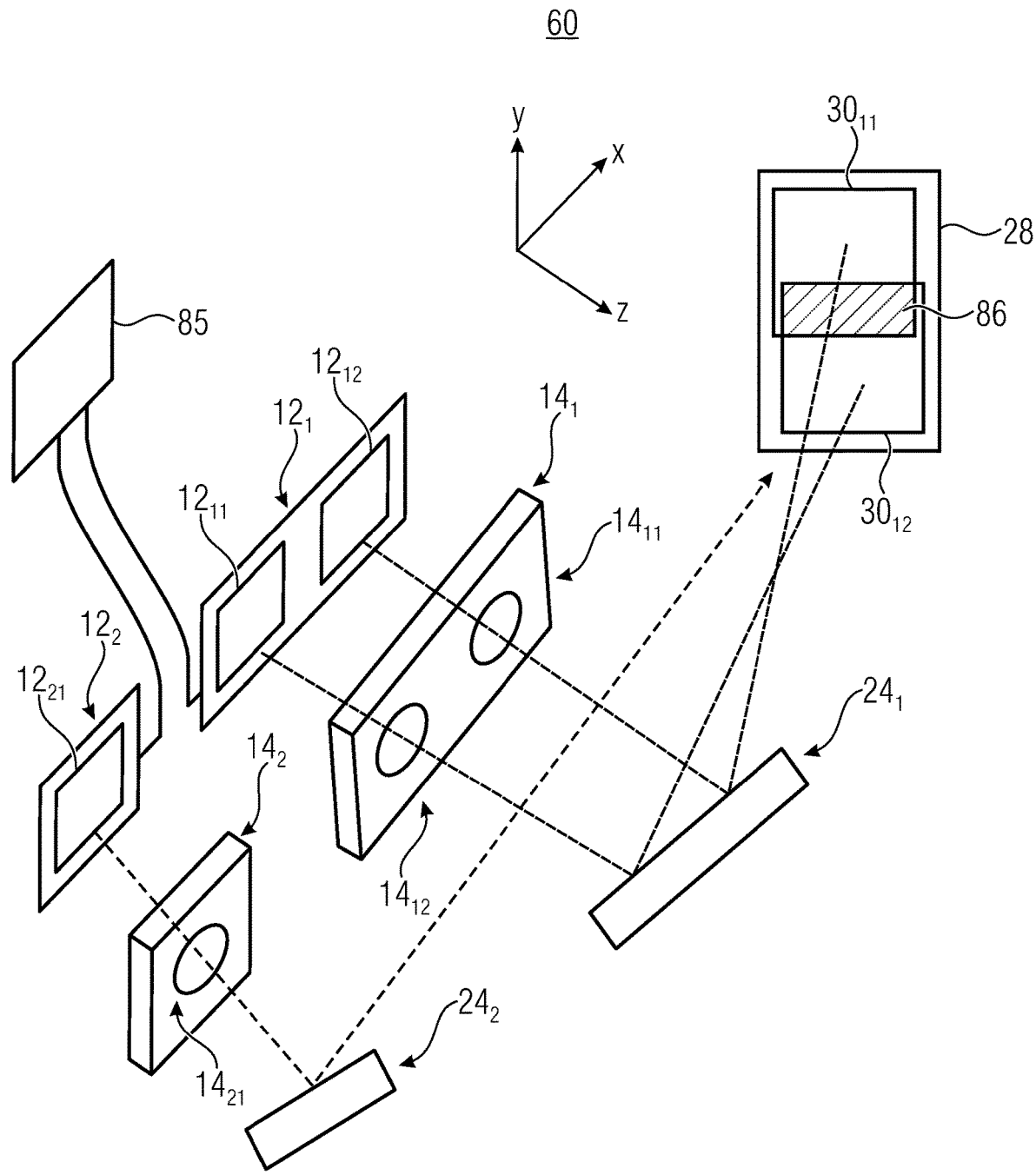
FIG. 6a-d schematic perspective views of multi-aperture imaging devices according to embodiments.

FIG. 6a shows a schematic block diagram of a multi-aperture imaging device 60 according to an embodiment that combines some of the specifics disclosed in connection with other embodiments. For example, a number of optical channels differ between a first arrangement of optical channels comprising the first plurality of optical channels, e.g., left channels $14_{1}$, and a second arrangement of optical channels. For example, a number of the first plurality of optical channel is exactly two. Further instead of a plurality of optical channels only a single, i.e., exactly one optical channel $14_{21}$ is a part of a second arrangement of optical channels, e.g., the right channels $14_{2}$.

As discussed, for fusing a pair of images of the first plurality of images, an image of the second arrangement or second plurality may be used by processor 85. In case of exactly two channels $14_{11}$ and $14_{12}$ in the first plurality such information may sufficiently provided by a single optical channel $14_{21}$ of the second arrangement $14_{2}$.

Whilst optical channels $14_{1}$ and $14_{2}$ may project a partial field of view $30_{11}$, $30_{12}$ respectively, the optical channel $14_{21}$ may cover at least the overlap area. For example, the optical channel may project the partial field of view $30_{11}$ and/or $30_{12}$, e.g., when projecting only one of the partial fields of view $30_{11}$ and $30_{12}$ within a tolerance range that might be caused, for example, due to the disparity, but may also project the total field of view 28. Implementing the optical channel to project the total field of view 28 may further allow to obtain the second total image by a single channel and/or to use the second total image and the fused first total image for 3D operations as described in connection with embodiments, e.g., in connection with FIG. 1.

According to an embodiment, the optical channels, at least of the first arrangement may be arranged along a line extension direction, e.g., along an x-direction. The partial fields of view $30_{11}$ and $30_{12}$ may be arranged perpendicular hereto along an image direction, e.g., along a y-direction. By way of non-limiting example, the x-direction may be parallel at least in parts to a horizontal direction and the image direction may be a vertical direction. Such a configuration may allow to reduce or avoid occlusions.

However, an arrangement of two optical channels, e.g., such that optical channels $14_{11}$ and $14_{12}$ face each other or look each other or look on different sides of a beam-deflecting means being arranged between the optical channels is not excluded from the embodiments. Alternatively or in addition the second arrangement $14_2$ may be arranged opposite to the first arrangement $14_1$ and may look towards the first arrangement, wherein the optical paths are deflected by opposing sides of the beam-deflecting device arranged between the first arrangement and the second arrangement.

Figure 6B:
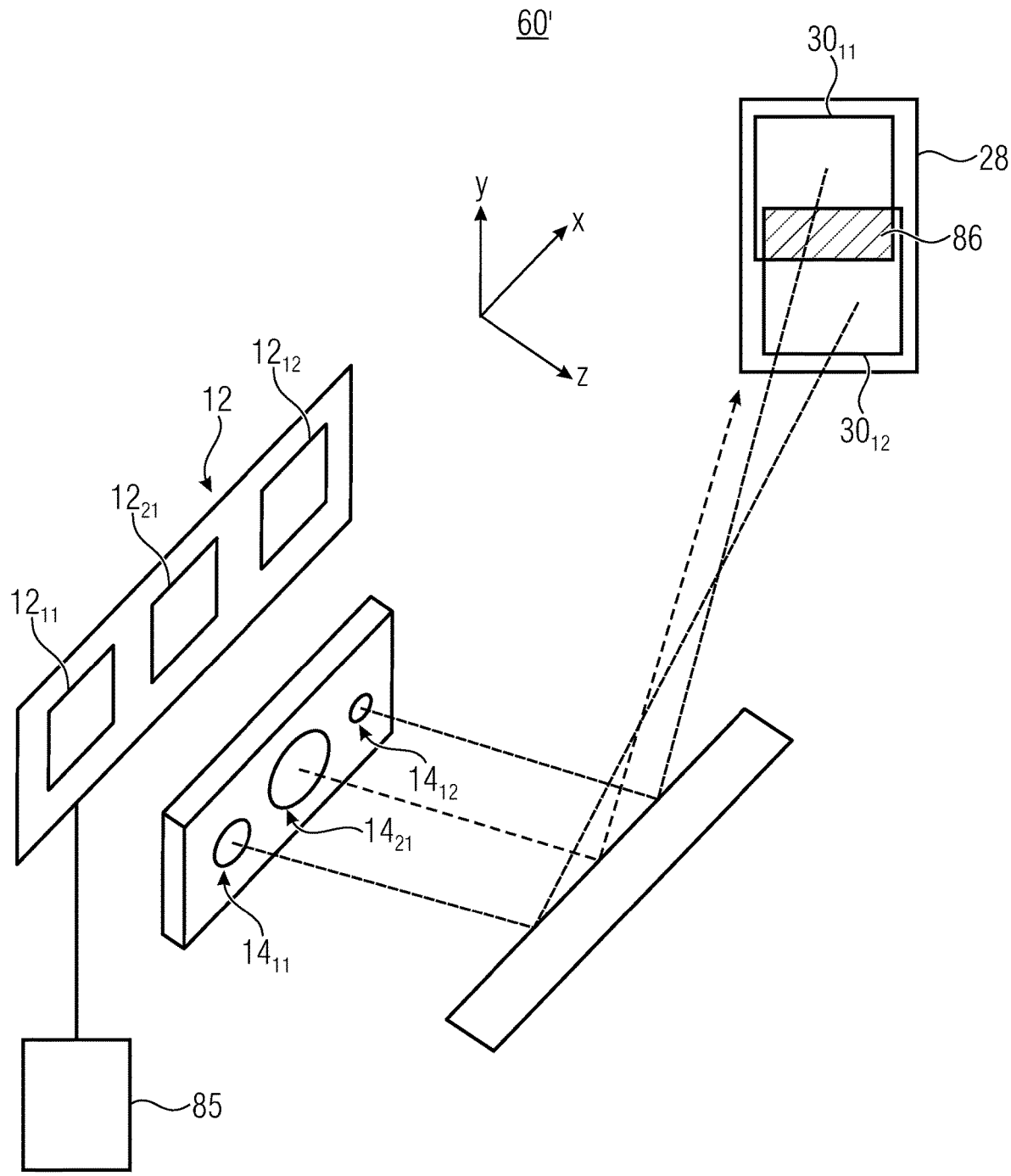

FIG. 6b shows a schematic block diagram of a multi-aperture imaging device 60' according to an embodiment that comprises a varied arrangement of optical channels when compared to multi-aperture imaging device 60. For example, the optical channel $14_{21}$ may be arranged between the optical channels $14_{11}$ and $14_{12}$, the symmetry obtained thereby allowing for a high image quality, especially when the optical channel $14_{21}$ is implemented to completely capture or image the total field of view 28. The optical channels $14_{11}$, $14_{12}$ and $14_{21}$ may thereby form a combined array of optical channels.

Figure 6C:
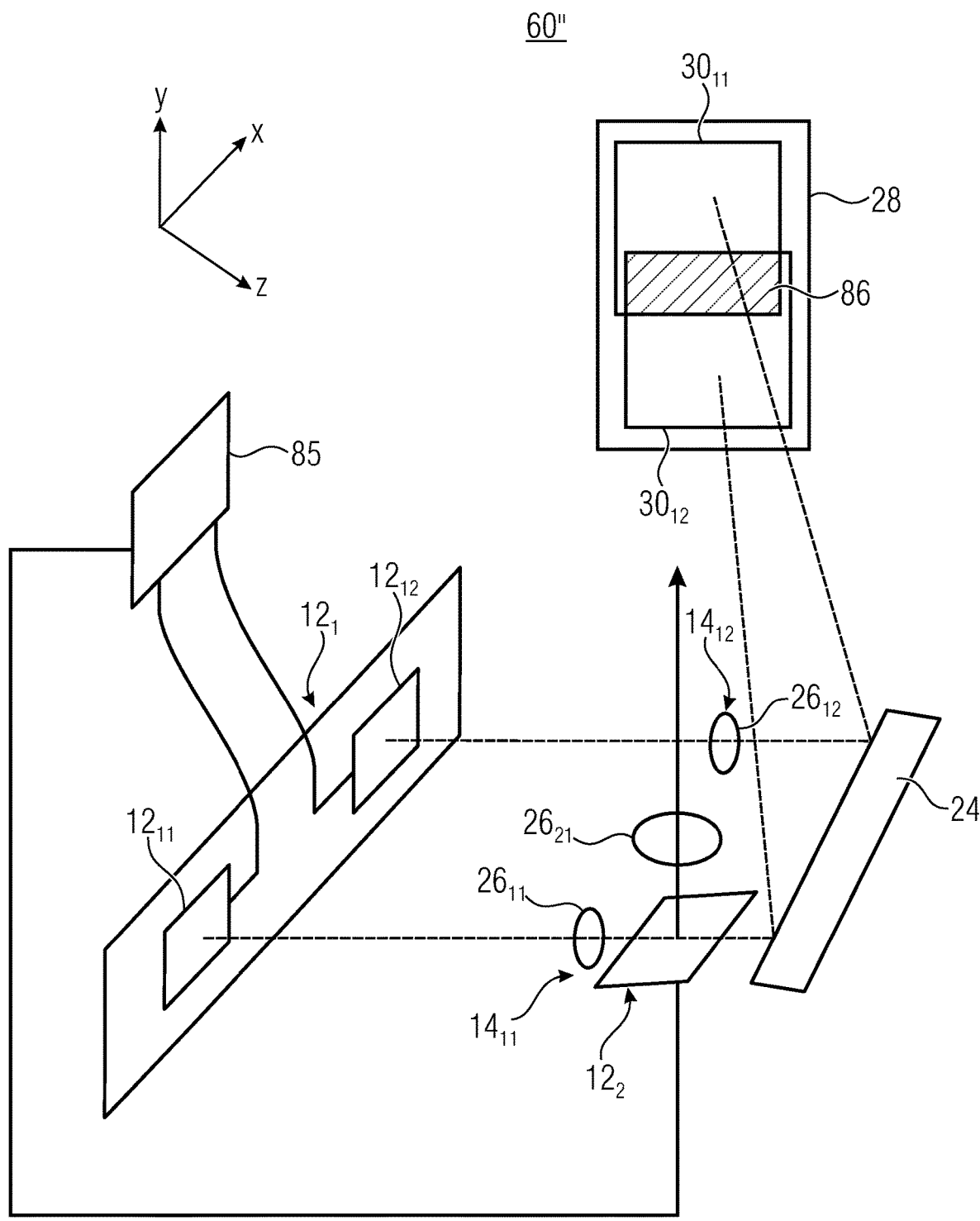

FIG. 6c shows a schematic block diagram of a multi-aperture imaging device 60" according to an embodiment that comprises a varied arrangement of optical channels when compared to multi-aperture imaging devices 60 and 60'. When starting from the multi-aperture imaging device 60', the optical channel $14_{21}$ which may be alternatively arranged beside array $14_1$ of FIG. 6a, may undeflected in view of an arrangement of a beam-deflecting device, look at the total field of view 28 or parts thereof. For example, the optics $16_{21}$ of optical channel $14_{21}$ may be rotated, e.g., by approximately 90° around an x-axis perpendicular to a line extension direction so as to change, when compared to FIG. 6b, a viewing direction of optical channel $14_{21}$. This may include a different arrangement of image sensor $12_2$ when compared to FIG. 6a and/or FIG. 6b but may allow, especially for comparatively large optics used to optionally capture the total field of view 28 completely, to avoid an increase of thickness of the multi-aperture imaging device based on large optics, as the large dimension may remain flat in the laying orientation of FIG. 6c. This does not exclude to perform redirecting the optical path between the image sensor and the optics.

The optics $16_{21}$ may but is not required to form an arrangement along a line with the optics $14_{11}$ and $14_{12}$.

Figure 6D:
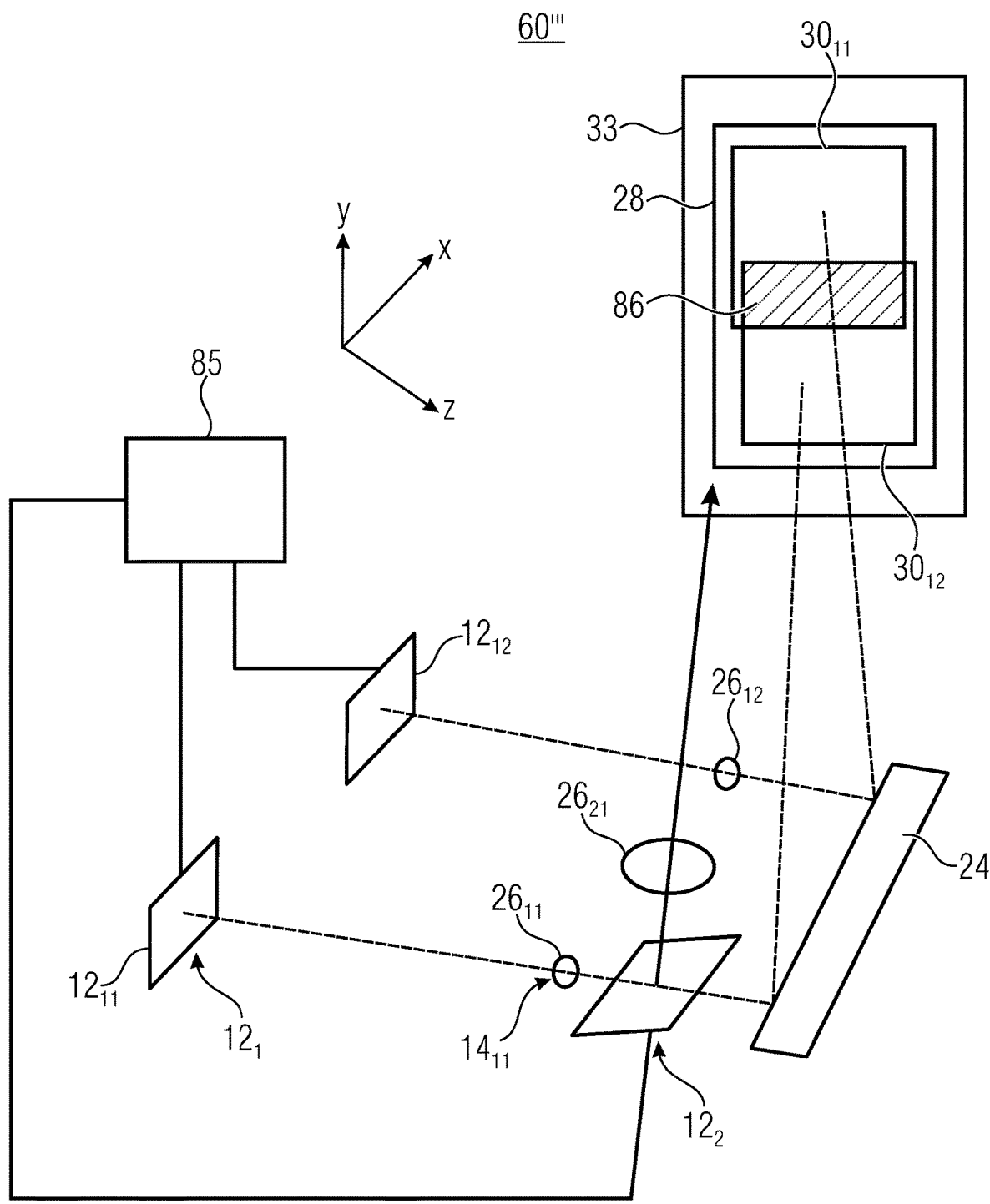

FIG. 6d shows a schematic block diagram of a multi-aperture imaging device 60''' according to an embodiment that comprises a varied configuration of optical channels when compared to multi-aperture imaging devices 60, 60' and 60". For example, the optical channel $14_{21}$ is adapted to cover a field of view 33 that comprises but may enlarge the total field of view 28, i.e., a scene captured by the second arrangement of optical channels may be larger than the total field of view 28. Optionally, a part of the total field of view 28, e.g., being different from the overlap area may be missing such as a part of the partial field of view $30_{11}$ or $30_{12}$ outside the overlap area 86.

As explicitly shown in FIG. 6d, embodiments are not limited to arrange image sensor areas of a component $12_1$ and/or $12_2$ at a same carrier or printed circuit board-PCB. Although the image sensor areas may be arranged in such a way, it is also possible to arrange one or more of them individually or as a separate group, e.g., such that a plurality of image sensor areas may be arranged as individual image sensors to implement individual image capturing devices that together operate as a module of the multi-aperture imaging device. That is, a carrier or PCB may be used to operate one or more image sensor areas and/or the multi-aperture imaging device may comprise one or more such image sensors.

The features of FIGS. 6a-d, e.g., the different viewing directions of the optical channels, the different arrangements of optical channels, in particular the alternating arrangement of FIG. 6c., individual image sensors and the different sizes of total field of views may be combined as alternatives or combination with some or all of the respective other features.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A multi-aperture imaging device for providing information on a scene, comprising:
   an image sensor;
   a first arrangement of optical channels having a first plurality of optical channels for projecting overlapping first partial fields of view of a total field of view on first image sensor areas of the image sensor;
   a second arrangement of optical channels for projecting at least a second partial field of view of the total field of view that overlaps with the first partial fields of view on a second image sensor area of the image sensor;
   wherein the first partial fields of view together cover the total field of view;
   a processor for fusing images that have been captured by the first arrangement of optical channels to a first total image, wherein the processor is configured to perform fusion at least in an overlap area of first partial fields of view of a pair of optical channels of the first plurality of optical channels by using disparities in a pair of images, wherein at least one of them has been captured by the second arrangement of optical channels whose projected second partial field of view overlaps at least with the overlap area; wherein the 3D multi-aperture imaging device is adapted to at least one of:
   wherein a number of the first plurality of optical channels is between 2 and 100, both inclusive, and the overlap area of the first partial fields of view of the pair of optical channels of the first plurality of optical channels is, as regards to the area, between ½ and ¹⁄₁₀₀₀ of an average image size of the images that are captured by the first plurality of optical channels:
   wherein a number of the second plurality of optical channels is between 1 and 100, both inclusive, and an overlap area of the second partial fields of view of a pair of optical channels of the second plurality of optical channels is, as regards to the area, between ½ and ¹⁄₁₀₀₀ of an average image size of the images that are captured by the first plurality of optical channels; and
   wherein the partial fields of view of the pair of optical channels of the first plurality of optical channels project into one another by a width of the overlap area of at least 20 pixels of the images that have been captured by the pair of optical channels of the first plurality of optical channels, at an image distance of 10 m.

2. The multi-aperture imaging device according to claim 1, wherein the second arrangement of optical channels comprises exactly one optical channel.

3. The multi-aperture imaging device according to claim 2, wherein the exactly one optical channel of the second arrangement is arranged between two optical channels of the first plurality of optical channels.

4. The multi-aperture imaging device of claim 2, wherein the exactly one optical channel of the second arrangement is adapted to capture the at least part of the total field of view without being deflected by a beam-deflecting means; wherein the multi-aperture imaging device comprises a beam deflecting means for deflecting the first plurality of optical channels.

5. The multi-aperture imaging device according to claim 2, wherein a field of view of the exactly one optical channel of the second arrangement corresponds to a field of view of one of the pair of optical channels within a tolerance range.

6. The multi-aperture imaging device according to claim 2, wherein a field of view of the exactly one optical channel of the second arrangement corresponds to the total field of view.

7. The multi-aperture imaging device according to claim 6, wherein a scene captured by the second arrangement of optical channels is larger than the total field of view.

8. The multi-aperture imaging device according to claim 1, wherein the first arrangement of optical channel comprises exactly two optical channels.

9. The multi-aperture imaging device according to claim 1, wherein the second arrangement of optical channels covers the total field of view.

10. The multi-aperture imaging device according to claim 1, wherein the first arrangement comprises exactly two optical channels that are arranged along a line extension direction, wherein to project a first partial field of view and a second partial field of view that are arranged along an image direction in the object area that is perpendicular to the line extension direction.

11. The multi-aperture imaging device of claim 1 being 3D multi-aperture imaging device.

12. The multi-aperture imaging device according to claim 1, wherein a base distance between the first arrangement of optical channels and the second arrangement of optical channels is greater than a single channel base distance between two adjacent optical channels of the first plurality of optical channels.

13. The multi-aperture imaging device according to claim 1, wherein the processor is configured to
fuse images that have been captured by the second arrangement of optical channels to a second total image and to use, in an overlap area of second partial fields of view of a pair of optical channels of the second arrangement of optical channels, disparities in a further pair of images, wherein at least one of them has been captured by one of the first plurality of optical channels whose projected first partial field of view overlaps with the overlap area of the second partial fields of view.

14. The multi-aperture imaging device according to claim 1, wherein the processor is configured to obtain a second total image from the second arrangement of optical channels; and to
generate a depth map by using disparities between the first and second total images.

15. The multi-aperture imaging device according to claim 13, wherein the processor is configured to
warp the first or the second total image into a virtual optical center or to warp and to fuse the first and second total images into the virtual view in order to acquire a final total image to which the depth map belongs.

16. The multi-aperture imaging device according to claim 1, wherein the processor is configured to
determine, for a depth map, a depth value for each image point of the first total image.

17. The multi-aperture imaging device according to claim 1, wherein the processor is configured such that the first partial fields of view to which the first plurality of optical channels is allocated, are mutually different and congruent to the at least one second partial field of view to which the second arrangement of optical channels is allocated.

18. The multi-aperture imaging device according to claim 1, wherein the processor is configured to
generate a depth map for the first total image by using disparities in pairs of images comprising, at least for each of the first plurality of optical channels, at least one pair comprising an image that has been captured by the respective one of the first plurality of optical channels and a further image that has been captured by an optical channel of the second arrangement of optical channels.

19. The multi-aperture imaging device according to claim 1, wherein the processor is configured to determine the disparities by using a cross-correlation of local sections of the pair of images.

20. A method for fusing images that have been captured by a multi-aperture imaging device comprising an image sensor, a first arrangement of optical channels having a first plurality of optical channels for projecting overlapping first partial fields of view of a total field of view on first image sensor areas of the image sensor and a second arrangement of optical channels for projecting at least a second partial field of view of the total field of view that overlaps with the first partial fields of view on a second image sensor area of the image sensor, wherein the first partial fields of view together cover the total field of view; the method comprising:
fusing images that have been captured by the first arrangement of optical channels to a first total image, by performing fusion in at least an overlap area of first partial fields of view of a pair of optical channels of the first plurality of optical channels by using disparities in a pair of images, wherein at least one of them has been captured by the second arrangement of optical channels whose projected second partial field of view overlaps at least with the overlap area; wherein fusing is performed by at least one of:
that a number of the first plurality of optical channels is between 2 and 100, both inclusive, and the overlap area of the first partial fields of view of the pair of optical channels of the first plurality of optical channels is, as regards to the area, between ½ and ¹⁄₁₀₀₀ of an average image size of the images that are captured by the first plurality of optical channels;
that a number of the second plurality of optical channels is between 1 and 100, both inclusive, and an overlap area of the second partial fields of view of a pair of optical channels of the second plurality of optical channels is, as regards to the area, between ½ and ¹⁄₁₀₀₀ of an average image size of the images that are captured by the first plurality of optical channels; and
that the partial fields of view of the pair of optical channels of the first plurality of optical channels project into one another by a width of the overlap area of at least 20 pixels of the images that have been captured by the pair of optical channels of the first plurality of optical channels, at an image distance of 10 m.

\* \* \* \* \*